No. 786,980. PATENTED APR. 11, 1905.
E. D. MISNER.
MOLDING MACHINE.
APPLICATION FILED MAY 2, 1904.
6 SHEETS—SHEET 2.

Witnesses

Inventor
Edgar D. Misner
By
Attorney

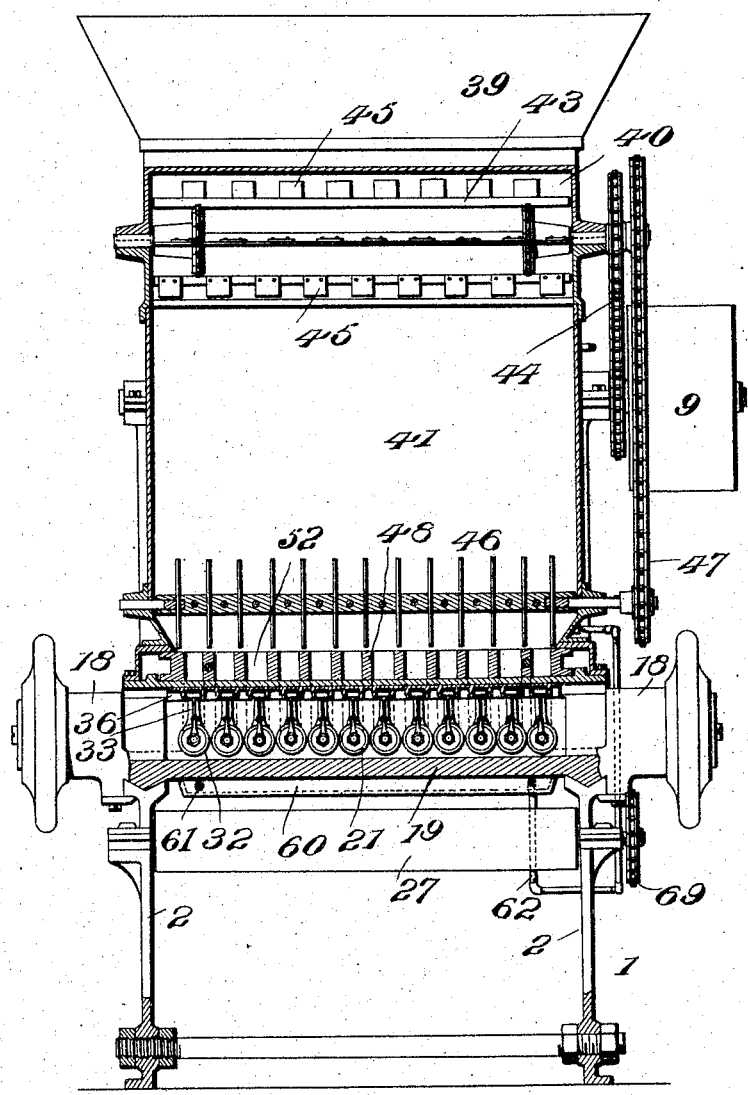

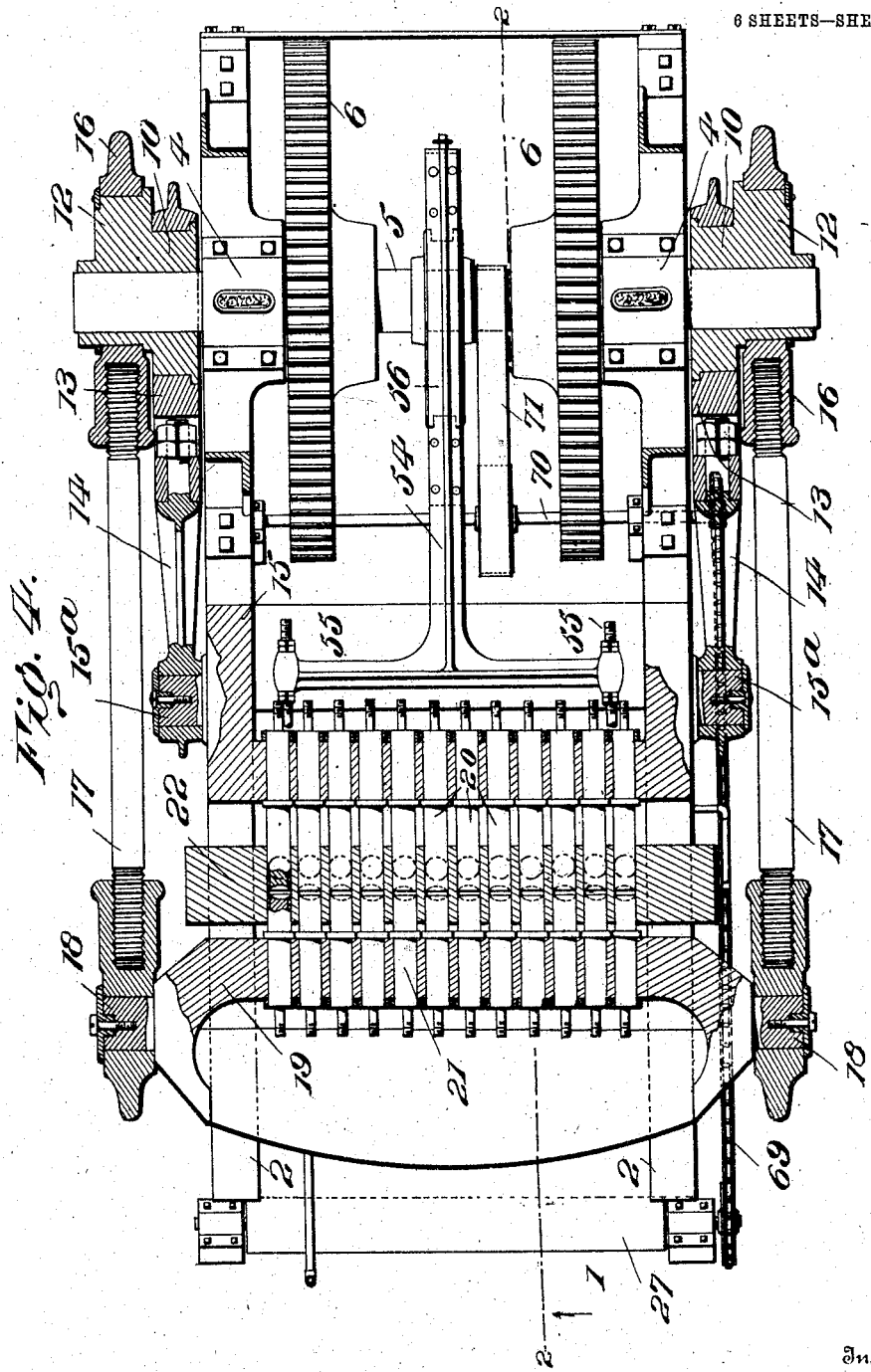

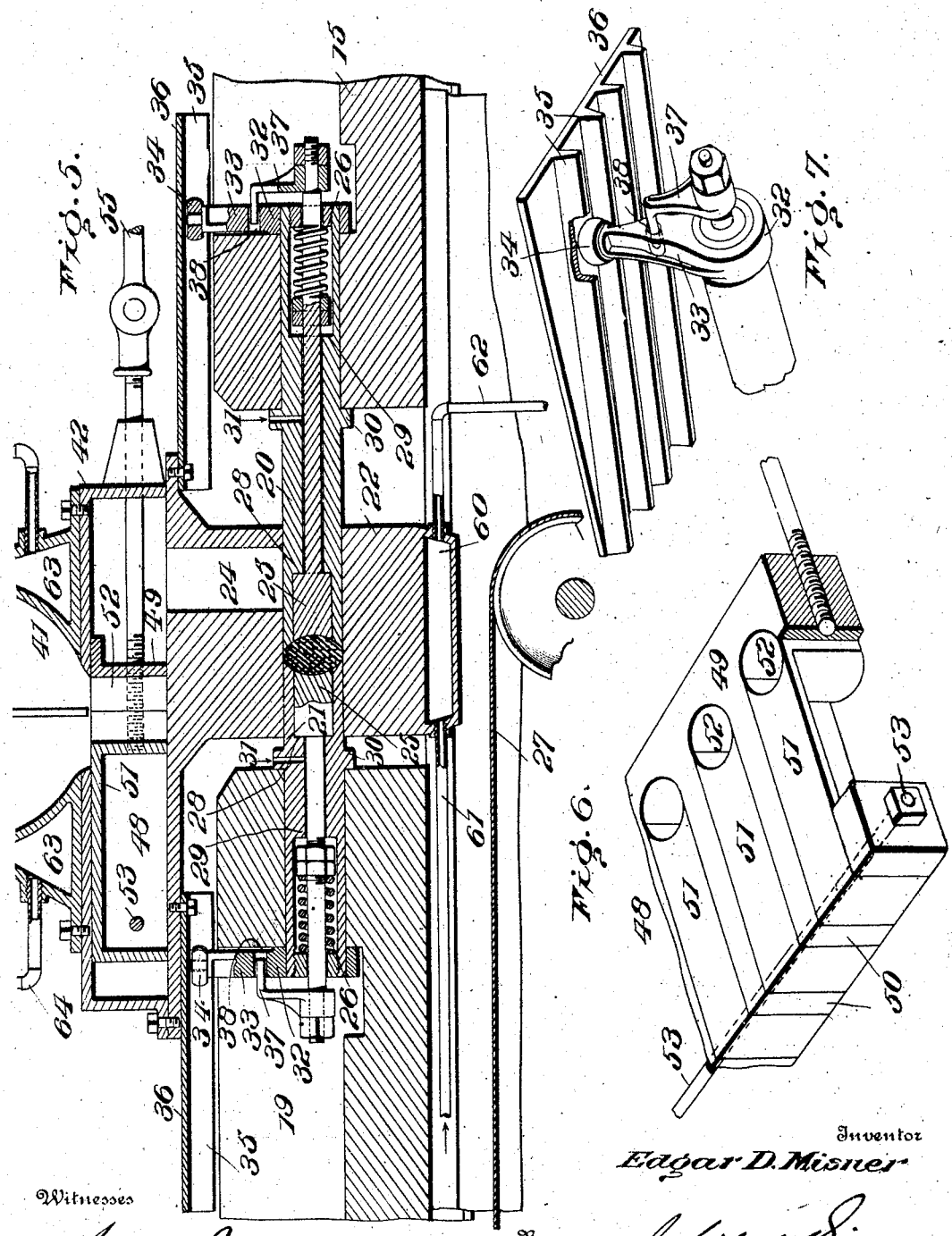

No. 786,980. PATENTED APR. 11, 1905.
E. D. MISNER.
MOLDING MACHINE.
APPLICATION FILED MAY 2, 1904.

6 SHEETS—SHEET 6.

Witnesses
Jr Immrie
W. C. Renfrow

Inventor
Edgar D. Misner
By
Attorney

No. 786,980.

Patented April 11, 1905.

UNITED STATES PATENT OFFICE.

EDGAR D. MISNER, OF ST. LOUIS, MISSOURI, ASSIGNOR TO WILLIAM C. RENFROW, TRUSTEE, OF JOPLIN, MISSOURI.

MOLDING-MACHINE.

SPECIFICATION forming part of Letters Patent No. 786,980, dated April 11, 1905.

Application filed May 2, 1904. Serial No. 206,008.

*To all whom it may concern:*

Be it known that I, EDGAR D. MISNER, of St. Louis, in the State of Missouri, have invented certain new and useful Improvements in Molding-Machines; and I do hereby declare the following to be a full, clear, and exact description of the invention, such as will enable others skilled in the art to which it appertains to make and use the same.

This invention relates to that class of molding-machines primarily designed for forming pulverulent fuel into briquets; and the primary object is to so construct and arrange the parts as to secure a firm and positive action, insuring the production of a perfectly-formed commercial article.

A further object is to provide for heating the material to a maximum degree at the time of compression, and a further object is to simplify the construction and enhance the operation of this class of machines.

The invention will be hereinafter fully set forth, and particularly pointed out in the claims.

Figure 1:
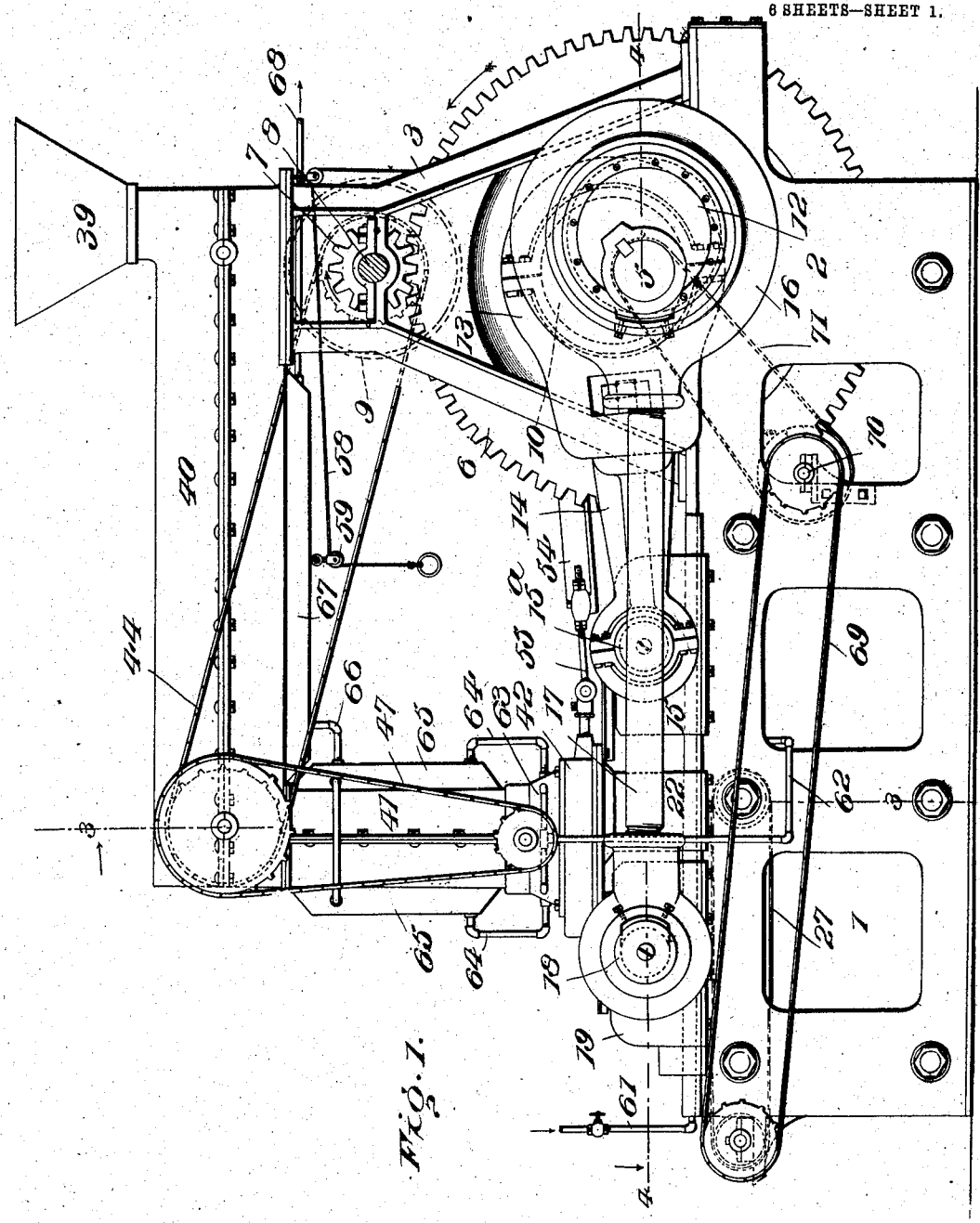
Figure 2:
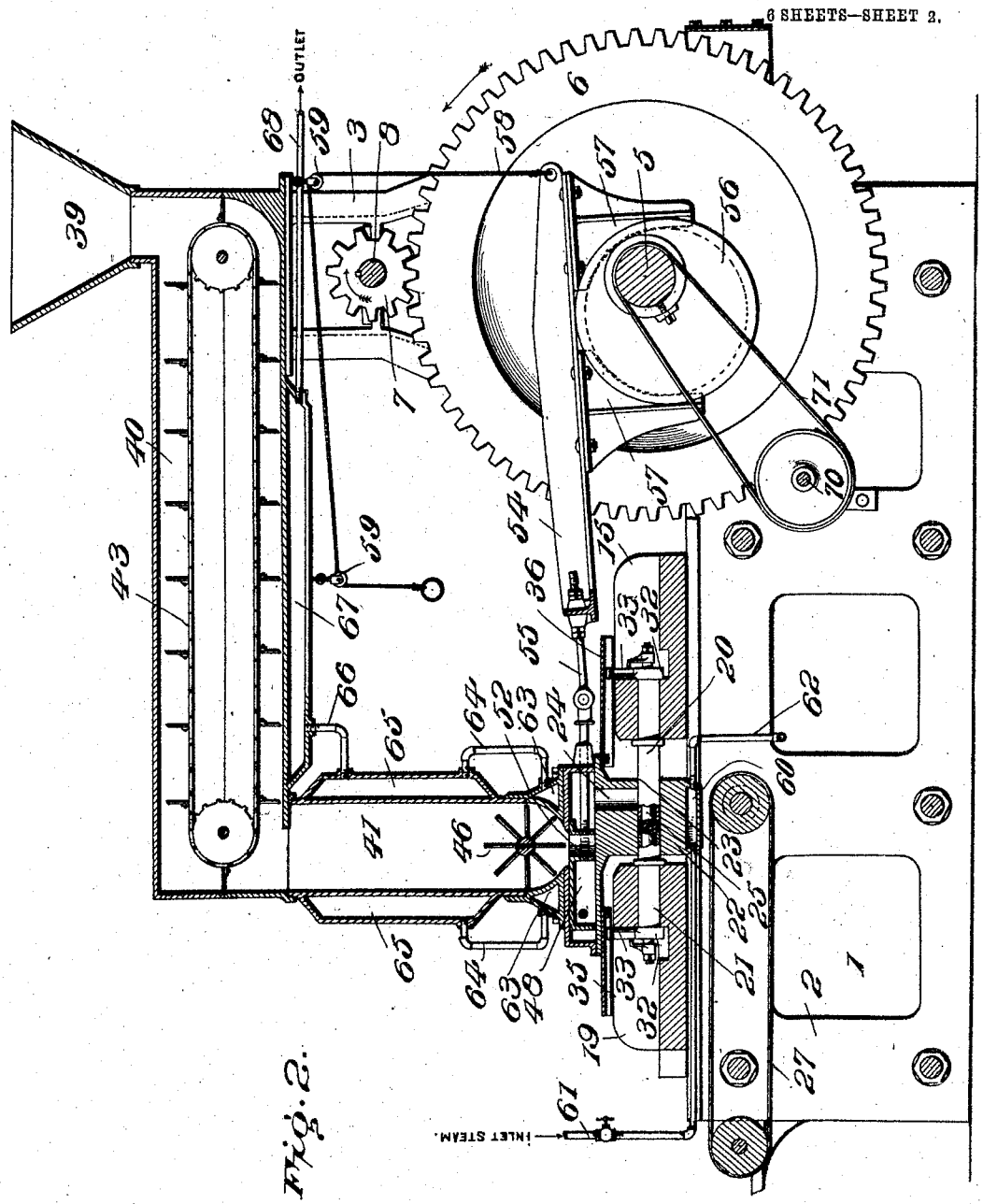
Figure 8:
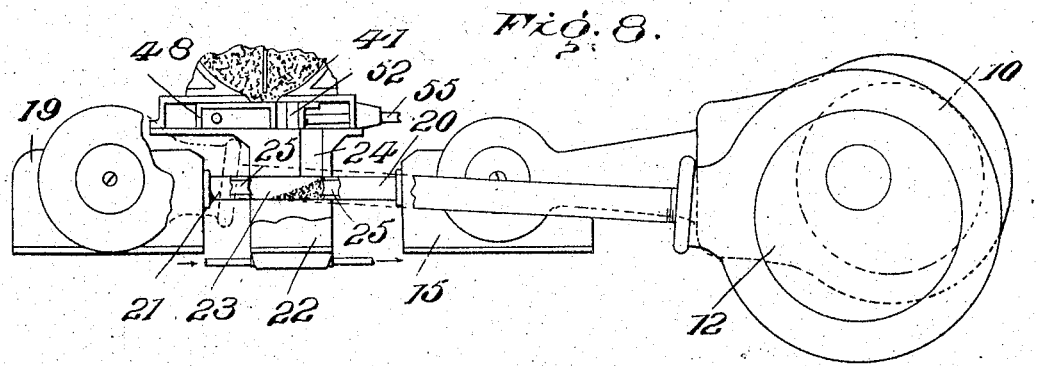
Figure 9:
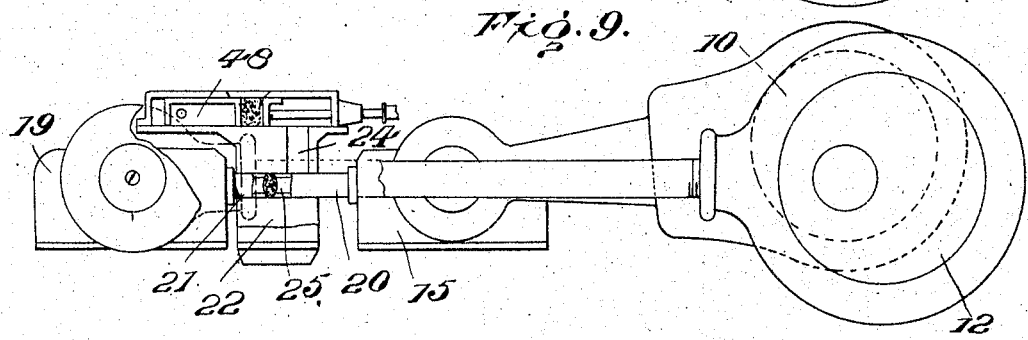
Figure 10:
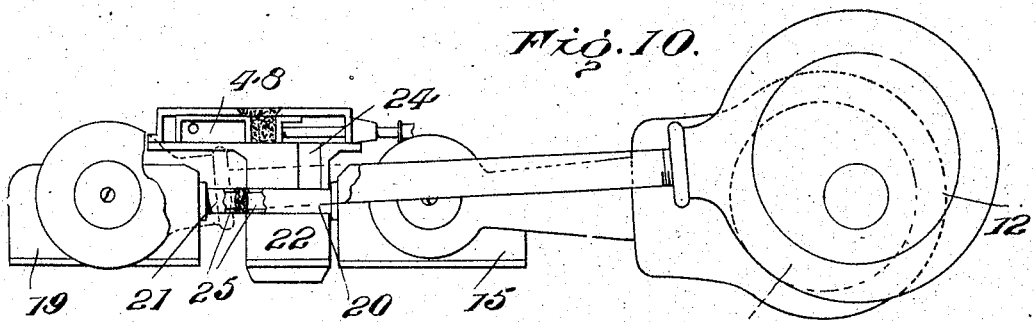
Figure 11:
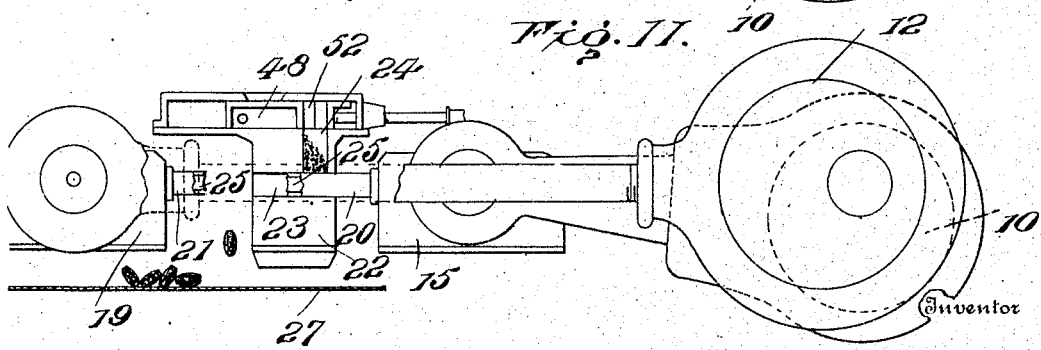

In the accompanying drawings, Figure 1 is a view in side elevation. Fig. 2 is a central longitudinal sectional view on line 2 2, Fig. 4. Fig. 3 is a vertical sectional view on line 3 3, Fig. 1. Fig. 4 is a horizontal sectional view on line 4 4, Fig. 1, with parts omitted. Fig. 5 is an enlarged vertical sectional view through the dies, die-housing, and feeder. Fig. 6 is a view in perspective of a portion of the feeder with parts broken away. Fig. 7 shows the means for rotating the dies. Figs. 8, 9, 10, and 11 are diagrammatic views showing the different positions of the dies, the die-bodies, and the actuating-cams.

Referring to the drawings, 1 designates the frame, comprising parallel sides 2 and standards 3. In the sides beneath the standards are the bearings 4 for the main shaft 5, carrying two large gear-wheels 6, which mesh with pinions 7 on the drive-shaft 8, carrying a belt-pulley 9. The main shaft is extended beyond its bearings so as to receive on each end cams 10 and 12, by which the two series of dies are actuated. The two cams at each end are formed integral, so that the die mechanisms will be positively actuated, not only from a common source, but also by means which will prevent any independent action, thereby insuring best results. The collars 13, surrounding the cams 10, are connected by pitmen 14 to trunnions $15^a$ of a die-carrying body 15, movable horizontally in guides on sides 2. The collars 16 of cams 12 are connected by pitmen 17 to the trunnions 18 of a second die-carrying body 19, likewise movable horizontally on said sides. The extent of the throw of the cams 10 and 12 is differential—that is to say the cams 12 being slightly greater in diameter than cams 10—the throw thereof is correspondingly greater, with the result that the outer die-carrying body 19 is moved in each direction a greater distance than the other die-carrying body, 15. Then, too, the cams 12 are set on quarter-turns 10, so that at no stage in the revolution of the main shaft will both cams be on a dead-center at the same time.

20 designates the series of dies mounted in die-carrying body 15, and 21 the corresponding series of dies mounted in the other die-carrying body, 19, the dies of the two series being movable in direct line with each other.

22 is the die-housing, fixedly mounted on sides 2 and formed with a series of transverse horizontal openings 23, corresponding to the cross-section of the dies, which latter are designed to work back and forth therein. This housing is also formed with a series of vertical supply-openings 24, which intersect and empty into the horizontal openings 23.

The dies are concaved at their inner opposed ends, so as to give the desired formation to the briquets. Extending longitudinally within each die is an ejector 25, normally extended by its spring 26 beyond the concaved face of the die, but designed to conform to the contour thereof when forced inward under pressure upon a mass of pulverulent material. As the dies recede and the space between them increases the ejectors move outwardly, unseating the molded briquets from the concaved die-faces and retaining the same until clear of the die-housing, by which time the dies will have traveled sufficiently apart to cause the ejectors to release the briquet and allow it to fall onto a conveyer 27, extended beneath the machine between the sides of the frame. The inward and outward movements of the ejectors are limited by stops 28 and 29, formed in chambering out the dies, in one of which chambers is located the spring 26. Each die is formed with a peripheral flange 30, which abuts against the front face of its respective die-carrying body, openings 31 being preferably formed in these flanges for supplying lubricant to the ejectors. Fast on the outer end of each die is a collar 32 of an arm 33, such collars serving in conjunction with flanges 30 to hold the dies within their respective carrying-bodies. The arms 33 carry at their upper ends rollers 34, which extend into grooves formed by series of diagonally-set parallel ribs 35, depending from plates 36, secured to flanges of the die-housing. By this means the several dies are caused to rotate axially as they are reciprocated longitudinally, thereby burnishing the briquets and giving them a smooth and finished appearance. To allow the several ejectors to move axially conjointly with the dies, I mount on the outer extended end of each ejector a crank-arm 37, the horizontal portion of which fits loose in an opening 38 of its respective arm 33. This construction not only insures the axial turning of the ejectors with the dies, but also permits the former to have their independent longitudinal movements.

39 is the feeding-hopper opening into a horizontally-disposed trough 40, supported at one end by the standards 3 and at the other end by a vertical chute 41, which at its lower end is secured to a hollow casing 42, fixed on the die-housing 22. Within the trough 40 is an endless conveyer-belt 43, which is driven by a chain 44, actuated from the drive-shaft. The teeth 45 on this conveyer-belt are in spaced-apart rows, and the teeth of each row are in line with the spaces between the teeth of the next following row of teeth, so that not only will all the material fed to the trough be carried forward to the chute, but the thorough intermixing thereof will be accomplished while it is being heated. The material falling into chute 41 is forced by a rotary agitator 46, driven by belt 47 out through the bottom of the chute and through a coincident opening in the casing 42. This outlet is out of line with the supply-openings 24 of the die-housing.

48 is the feeder movable horizontally within the casing 42 on top of the die-housing and designed to periodically supply the pulverulent material to the openings of the die-housing. This feeder (see Fig. 6) consists of a plate 49, having a series of parallel cut-outs forming spaces to accommodate between the several arms 50 a series of plates 51 flush with the upper surface of plate 49. The inner downwardly-flanged ends of these plates 51 are curved semicircularly to conform to corresponding curvatures in the thickened portion of plate 49, forming conjunctively openings or pockets 52, wherein the material from the hopper is conveyed to the vertical supply-openings 24 of the die-housing. The plates 51 are held tight between the arms 50 by a longitudinally-extended nutted rod 53. By loosening the latter the several plates 51 may be moved longitudinally to increase or lessen the capacity of the openings or pockets according to the size it is desired to make the briquets. The feeder so fits within casing 42 that the top of the latter acts as a cut-off to prevent the feeder carrying any greater amount of material than can be accommodated by the pockets, thus preventing all waste and insuring a uniformity in the supply to the die-housing. This feeder is reciprocated by a T-shaped pitman 54, connected thereto at the ends of its laterals by jointed rods 55, such pitman being actuated by a cam 56, fast on the main shaft intermediate the gear-wheels. The pitman is equipped with two depending legs 57, curved on their inner opposite faces to conform to the periphery of the cam, such legs permitting the pitman to be elevated out of engagement with the cam. To one end of the pitman is connected a rope or chain 58, passed over pulleys 59, the free end of such chain being suspended within easy reach. By pulling on this chain the pitman may be readily lifted out of engagement with the cam when it is desired to quickly discontinue the feeding of material from the chute to the die-housing. Then, too, the feeding may be as quickly restarted by lowering the pitman into engagement with its actuating-cam.

The die-housing 22 is preferably made of steel and in its under side is formed with or has secured thereto a steam jacket or chamber 60, into which steam is supplied through a pipe 61, the object being to constantly maintain the die-housing at a high temperature, so that the mass of material will receive its maximum heat as it is being molded by the dies. The steam, which is preferably forced under heavy pressure into this chamber, passes therefrom through piping 62 to a jacket 63, enveloping the lower end of chute 41, and from thence through piping 64 into jackets 65 on the sides of the chute and thence through piping 66 into a jacket 67, secured to the bottom of the feed-trough, from whence it finds its escape through pipe 68. Thus it will be seen that not only is the pulverulent material thoroughly heated from the time it is deposited into the trough, but it is subjected to the highest degree of heat at the very point where most required, resulting in bringing the material to a soft plastic state, rendering it capable of being readily and perfectly worked into briquets of commercial form.

The operation is as follows: The mass of finely-ground or pulverized material is deposited through the hopper into one end of the feed-trough and by the rows of alternately-arranged conveyer-teeth is thoroughly mixed as it is carried over the heated bottom of such trough and being discharged into the chute, where it is subjected to a still greater degree of heat, is forced outwardly therefrom by the revolving agitator. When the openings or pockets of the feeder are coincident with the chute-outlet, the material will fall into such pockets, and when the feeder is moved forwardly by the cam 56 acting on pitman 54 the material will be deposited into the vertical openings of the stationary die-housing. (See Fig. 11.) At this time the inner series of dies 20 is on its rearward stroke, and by the time such stroke is completed such dies will have passed the vertical openings 24, allowing the material to fall into the horizontal openings 23 in line between the two series of dies. (See Fig. 8.) Just previous to this the outer series of dies 21 has started forward on its return stroke and the dies will have just entered the openings 23 as the inner series start forward to meet the former. Thereupon the two series of dies will engage the material in the horizontal openings at a point about midway between the vertical openings and the rear side of the die-housing. Thus the maximum of pressure is applied to the mass of material as the two series of dies are brought directly toward each other. The material being held between the dies within the horizontal openings of the housing is compressed into perfectly-formed briquets, the walls of the openings serve to prevent feathered edges, and thereupon the outer series of dies 21 commences its return stroke while the inner series is completing its outer stroke, and at the same time the two series of dies, as well as their ejectors, are turned axially for the purpose of burnishing or smoothing the briquet before hold thereon is released. Now by reason of the differential movements between the two series of dies the outer series on its outer movement travels slightly faster than the inner series, with the result that while the die-faces themselves release their hold upon the briquet the several plungers of the two series of dies move in opposite directions under the influence of their respective springs, so as to not only engage and hold the completed briquet, but to insure its positive removal from the concaved faces of both dies. (See Fig. 10.) By this time the briquet is carried by the two series of dies or, more properly, by their respective ejectors to a point just clear of the rear face of the die-housing, whereupon the briquet will fall onto the conveyer 27. This conveyer is shown as being actuated by a chain 69, driven from a counter-shaft 70, which is actuated by a belt 71, driven by the main shaft.

It is obvious that this machine is adapted for molding various articles, although specially designed for the manufacture of compressed fuel in commercial form.

I claim as my invention—

1. A molding-machine comprising a stationary die-housing having a die-opening, means for supplying a predetermined amount of pulverulent material to such opening, opposite dies movable in said opening, means for actuating said dies to compress the material while it is within such opening, such means causing the dies to travel first in opposite directions or toward each other and then in the same direction until the completely-compressed material between them is free of the die-housing whereupon the dies move in opposite directions, and means for heating such die-housing.

2. A molding-machine comprising a stationary metallic die-housing having a die-opening and a jacket or chamber, means for supplying a predetermined amount of pulverulent material to such opening, opposite dies movable in said opening, means for actuating said dies to compress the material while it is within such opening, such means causing the dies to travel first in opposite directions or toward each other and then in the same direction until the completely-compressed material between them is free of the die-housing, and means for supplying heat to said jacket or chamber.

3. A molding-machine comprising a stationary die-housing having a series of die-openings, means for supplying a predetermined amount of pulverulent material to such openings, two series of oppositely-arranged dies movable in said openings, means actuated from a common source for moving both series of dies to compress the material while it is within such openings, such means causing the dies to travel first in opposite directions or toward each other and then in the same direction until the completely-compressed material between them is free of the die-housing, and ejectors carried by the dies for removing the compressed mass therefrom.

4. A molding-machine comprising a stationary die-housing having a series of die-openings, means for supplying pulverulent material to such openings, two series of oppositely-arranged dies movable in said openings, means actuated from a common source for moving both series of dies to compress the material within such openings, such means causing the dies to travel first in opposite directions and then in the same direction until the compressed material between them is free of the die-housing, ejectors carried by the dies for removing the compressed mass therefrom, and means for axially turning the dies and the ejectors during their longitudinal movements.

5. A molding-machine comprising a stationary die-housing having a series of die-openings, means for supplying pulverulent material to such openings, two series of oppositely-arranged non-yielding dies movable in said openings, means actuated from a common source for moving both series of dies to compress the material while it is within such openings, such means causing the dies to travel first in opposite directions or toward each other and then in the same direction until the completely-compressed material between them is free of the die-housing, whereupon the dies move in opposite directions, one series traveling at a greater speed than the other, and means carried by the two series of dies for removing the compressed mass therefrom.

6. A molding-machine comprising a stationary die-housing, having a series of die-openings, means for supplying pulverulent material to such openings, two series of oppositely-arranged dies movable in said openings, means actuated from a common source for moving both series of dies to compress the material within such openings, such means causing the dies to travel first in opposite directions and then in the same direction, one series traveling at a greater speed than the other, means carried by the two series of dies for removing the compressed mass therefrom, and means for axially turning said latter means and the dies during their longitudinal movements.

7. The combination with the die-housing having die-openings therein, of the two series of oppositely-arranged dies movable in said openings, arms mounted on said dies extending outwardly therefrom, obliquely-arranged parallel guideways for said arms, and means for moving both series of dies to compress the material within such openings, said arms effecting the axial turning of said dies during the longitudinal movements thereof.

8. The combination with the die-housing having die-openings therein, of the two series of oppositely-arranged dies movable in said openings, arms mounted on said dies extending outwardly therefrom, obliquely-arranged parallel ribs with which said arms are designed to engage, longitudinally-movable ejectors mounted in said dies, means connecting said ejectors to said arms, and means for moving both series of dies, said arms effecting the axial turning of said dies and ejectors during the longitudinal movements thereof.

9. The combination with the die-housing having die-openings therein, of the two series of oppositely-arranged dies movable in said openings, arms mounted on said dies extending outwardly therefrom, and having openings therein, obliquely-arranged parallel ribs with which said arms are designed to engage, longitudinally-movable ejectors mounted in said dies, cranked arms mounted on said ejectors and extended into the openings of said arms, and means for moving both series of dies, said dies and ejectors being axially turned during the longitudinal movements thereof.

10. A molding-machine comprising a stationary die-housing having die-openings, means for supplying a predetermined amount of pulverulent material to such openings, two series of oppositely-arranged non-yielding dies movable in said openings, die-carrying bodies wherein said dies are fixedly mounted, a main actuating-shaft, means mounted thereon connected to both of said die-carrying bodies for reciprocating the latter, one of such bodies being positively moved at a slightly greater speed than the other.

11. A molding-machine comprising a stationary die-housing having die-openings, means for supplying pulverulent material to such openings, two series of oppositely-arranged dies movable in said openings, die-carrying bodies for said dies, a main actuating-shaft, two pairs of cams mounted on said shaft, the cams of each pair being made integral and one cam slightly larger than the other, the centers of the two cams being eccentric to the axis of the main actuating-shaft, means engaging said cams connected to the respective die-carrying bodies for reciprocating the latter, one of such bodies being moved at a slightly greater speed than the other.

12. A molding-machine comprising a stationary die-housing having die-openings, and intersecting vertical supply-openings, a source of supply out of vertical line with said supply-openings, a horizontally-disposed feeder movable between said source of supply and said vertical openings, means for cutting off the material from the top of the feeder, means for actuating such feeder, opposite series of dies reciprocal in said die-housing, and means for actuating the dies.

13. A molding-machine comprising a stationary die-housing having die-openings and intersecting vertical supply-openings, a source of supply out of vertical line with said supply-openings, a horizontally-disposed feeder movable between said source of supply and said vertical openings, said feeder having a series of openings or pockets, means for adjusting the size of such openings or pockets, means for actuating such feeder, opposite series of dies reciprocal in said die-housing, and means for actuating the dies.

14. The combination with the die-housing having die-openings and intersecting vertical supply-openings, and a source of supply out of vertical line with said supply-openings, of a horizontally-disposed feeder movable between said source of supply and said vertical openings, said feeder having semicircular curved portions, and longitudinally-movable plates having correspondingly-curved portions, means for binding said plates, means for actuating the feeder, opposite series of dies reciprocal in said die-housing, and means for actuating the dies.

15. In a molding-machine, a feeder comprising a plate having a series of cut-outs and semicircularly-curved portions, a series of plates fitted in said cut-outs having semicircular-curved portions for forming, conjunctively, with the curved portions of the plate openings or pockets, and a binding-rod for holding said plates within said cut-outs, as set forth.

16. In a molding-machine, the combination with the die-housing, a source of supply, and the feeder, of the shaft having a cam thereon, a pitman connected to said feeder having means for engaging said cam, and means for moving said pitman out of engagement with the cam, as set forth.

17. In a molding-machine, the combination with the die-housing, a source of supply, and a feeder, of the shaft having a cam thereon, a pitman, jointed rods connecting said pitman to said feeder, legs depending from said pitman having curved portions designed to conform to said cam, and means connected to said pitman for raising said legs out of engagement with the cam.

18. In a molding-machine, the combination with the die-housing, a source of supply, and the feeder, of the shaft having a cam thereon, a T-pitman, jointed rods connecting the laterals of said pitman to said feeder, legs depending from said pitman having curved portions designed to conform to said cam, and a suspended chain connected to one end of said pitman for raising the legs thereof out of engagement with the cam, as set forth.

19. A molding-machine comprising a horizontally-disposed feed-trough, an endless conveyer therein, a vertically-disposed chute, a feeder movable beneath said chute, a stationary die-housing having die-openings and intersecting supply-openings out of line with said chute, means for actuating said feeder, two series of oppositely-arranged dies, means for actuating the same, a steam-jacket beneath said die-housing, steam-jackets connected to said chute and to said trough, and piping connecting the several steam-jackets and for supplying steam to the die-housing, as set forth.

20. A molding-machine comprising a horizontally-disposed feed-trough, an endless conveyer therein having spaced-apart rows of teeth, the teeth of the several rows being alternately arranged, means for actuating said conveyer, a chute leading from the trough, a stationary die-housing, means for conveying the material from said chute to said die-housing, two series of oppositely-arranged dies, means for actuating the same, and means for heating said die-housing, as set forth.

21. A molding-machine comprising a horizontally-disposed feed-trough, an endless conveyer therein having spaced-apart rows of teeth, the teeth of the several rows being alternately arranged, means for actuating said conveyer, means for heating the trough, a chute leading from the latter, a stationary die-housing, means for conveying the material from said chute to said die-housing, two series of oppositely-arranged dies, means for actuating the same, and means for heating said die-housing and connected with the means for heating said trough, as set forth.

22. The combination with the stationary die-housing having a steam-jacket, and a series of die-openings, and an intersecting series of supply-openings, of a casing mounted on said die-housing, a supply-chute mounted on said casing, a feeder movable within said casing for transferring material from said chute to said supply-openings, the top of said casing acting as a cut-off for the material carried by the feeder from the chute, means for adjusting said feeder for regulating the quantity of material to be carried thereby, the die-housing, a steam jacket or jackets enveloping said chute, means for supplying steam to the jacket of the die-housing, piping connecting the latter to the jackets of the chute, two series of oppositely-arranged dies movable in said die-openings, and means for actuating said dies, as set forth.

In testimony whereof I have signed this specification in the presence of two subscribing witnesses.

EDGAR D. MISNER.

Witnesses:
FRANCIS S. MAGUIRE,
W. C. RENFROW.